(12) United States Patent
Bennett et al.

(10) Patent No.: US 12,495,189 B2
(45) Date of Patent: Dec. 9, 2025

(54) MANAGING AUDIO ASSETS

(71) Applicant: GOOGLE LLC, Mountain View, CA (US)

(72) Inventors: Natalie Bennett, Mountain View, CA (US); Lucy Mao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 223 days.

(21) Appl. No.: 18/144,982

(22) Filed: May 9, 2023

(65) Prior Publication Data
US 2024/0223868 A1 Jul. 4, 2024

Related U.S. Application Data

(60) Provisional application No. 63/478,151, filed on Dec. 31, 2022.

(51) Int. Cl.
*G06F 3/16* (2006.01)
*H04N 21/81* (2011.01)

(52) U.S. Cl.
CPC ......... *H04N 21/8106* (2013.01); *G06F 3/165* (2013.01)

(58) Field of Classification Search
CPC .................... H04N 21/8106; G06F 3/165
See application file for complete search history.

(56) References Cited

U.S. PATENT DOCUMENTS

2020/0169591 A1\* 5/2020 Ingel .................. G10L 13/08

\* cited by examiner

*Primary Examiner* — Joseph Saunders, Jr.
(74) *Attorney, Agent, or Firm* — MARSHALL, GERSTEIN & BORUN LLP

(57) ABSTRACT

A method for managing audio assets includes selecting a content item for display at multiple geographic locations, including selecting a plurality of variants corresponding to the respective geographic locations. The variants include a shared component of the content item. The method also includes determining a set of audio components, where each of the variants includes two or more audio components of the set of audio components, and determining whether any of the variants exceeds a duration limit. The method also includes, in response to determining that a particular one of the variants exceeds the duration limit, generating (i) an indication that the particular one of the variants exceeds the duration limit, and (ii) an indication of an audio component that likely causes the particular one of the variants to exceed the duration limit.

14 Claims, 3 Drawing Sheets

MANAGING AUDIO ASSETS

FIELD OF THE DISCLOSURE

This disclosure relates to generating content items having multiple variants and, in particular, generating content items using multiple audio assets.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A party may create a content item for presentation via a web resource using multiple audio tracks. For example, the content item can include voice, background music, sound effects, etc. When the content item is an advertisement which a certain service provider can present (e.g., via a search engine) in different geographic regions, the content item can include different audio components, such as narration in different respective languages. It is difficult to effectively manage these multiple variants of content items. For example, validating the variants relative to certain threshold values, and filtering based on target signals, generally requires many operations.

DETAILED DESCRIPTION OF THE DRAWINGS

A system provides an interface for editing a content item that includes multiple audio components. The content item can be referred to as a "creative." and versions of the content item can be referred to as "variants."

Figure 1:
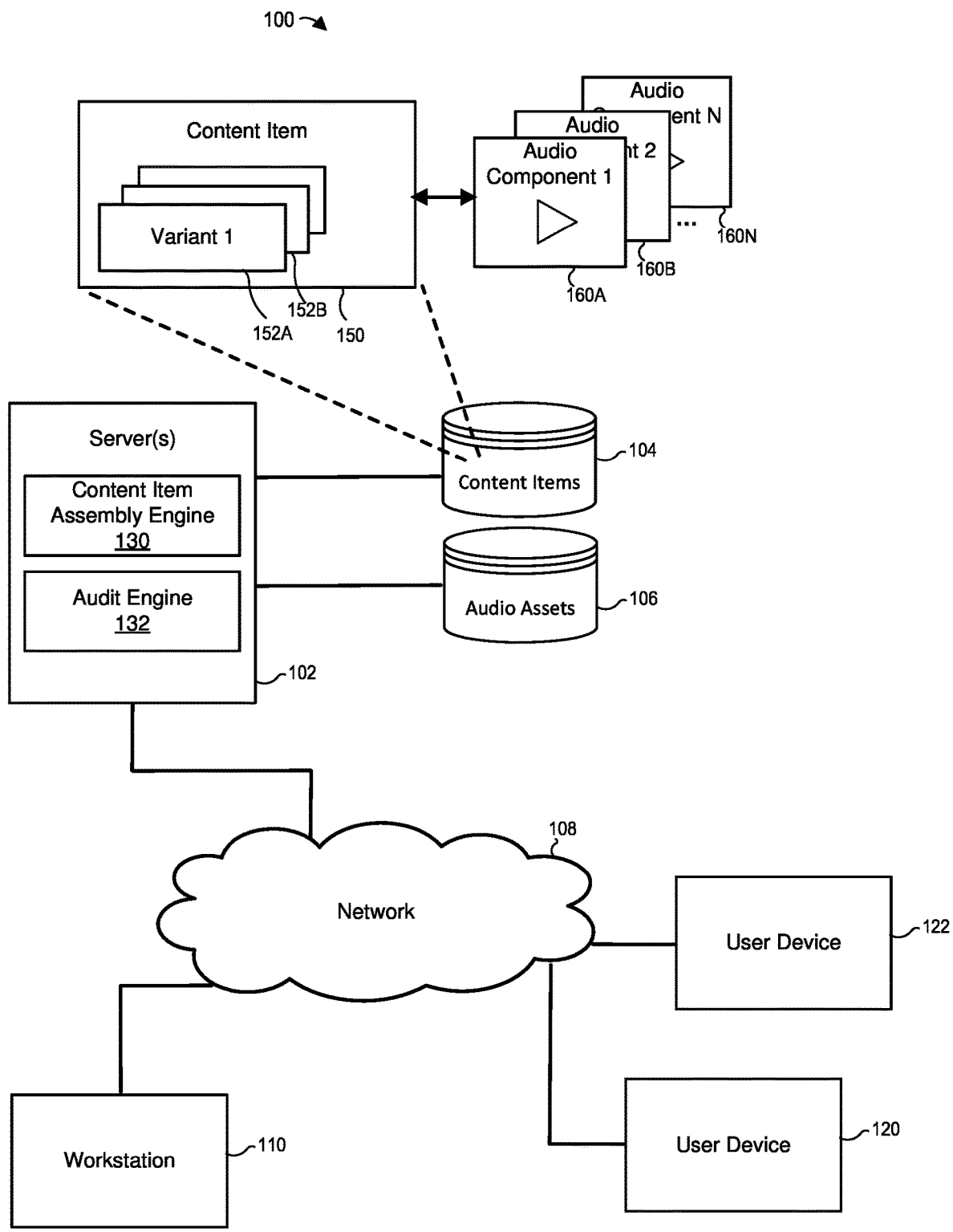
FIG. 1 is a block diagram of an example computing system in which the techniques of this disclosure can be implemented.

Referring to FIG. 1, an example computing environment 100 includes one or more servers 102 which an operator of a workstation 110 an access via a communication network 108. The server 102 is connected to a content item database 104 and an audio asset database 106. The server 102 can generate content items for presentation via user devices 120 and 122, for example.

The server 102 can implement a content item assembly engine 130 configured to generate content items using text, imagery, and multiple audio components stored in the database 106. The audit engine 132 is configured to provide an interface of FIG. 2 for reviewing variants of content items. Each content item 150 can include variants 152A, 152B, etc. corresponding to different geographic locations, for example. A variant 152A, 152B, etc. can include one or several audio components 160A, 160B . . . 160N. The components 130 and 132 can be implemented as sets of software instructions on a computer-readable medium and executable by one or more processors.

The variants 152A, 152B, etc. can include at least one shared component which can be text, video content, audio content, and/or metadata that logically connects the variants 152A, 152B, etc. to the content item 150.

Example operation of the system of FIG. 1 is discussed with reference to the user interface screen 200 of FIG. 2. In this example implantation, the operator of the workstation 110 develops a content item to be presented as content (e.g., an advertisement) in various geographic locations. The audit engine 132 can provide, via the interface screen 200, a control 210 for accessing the canvas mode in which the operator can select the text, audio, and video components; a control 212 for accessing an interface for specifying dynamic rules in order to define audiences for the variants; a control 214 for accessing the details of the content item; and a control 216 for accessing the inspection module (depicted as currently active in FIG. 2).

Generally speaking, the audit engine 132 can enable the operator to preview and play a variant of the content item, such as an advertisement, filter the variants based on targeting signals, validate variants against creative duration, and invoke speech-to-text functionality to preview voice assets without the need to play the audio.

Figure 2:
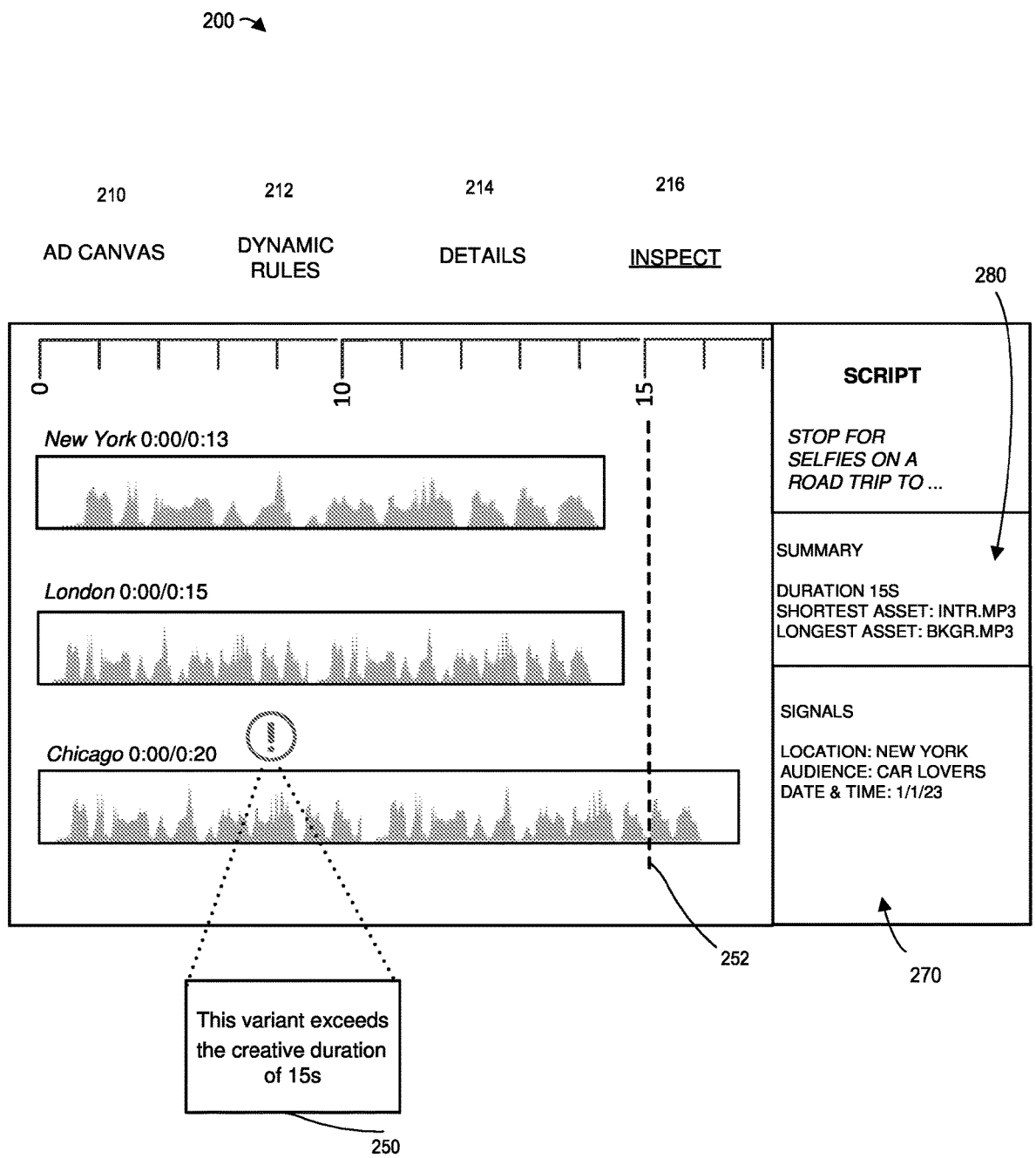
FIG. 2 illustrates an example user interface for managing variants of a content item, which the system of FIG. 1 can provide to an operator.

As illustrated in FIG. 2, the audit engine 132 can automatically generate an indication 250 when the duration of the variant exceeds a predefined duration limit 252. In this example, the predefined duration is 15 s (15 seconds), and the audit engine 132 flags any variant that exceeds 15 s. In some implementations, the audit engine 132 allows the operator to inspect each variant to determine which asset (audio component) has the longest duration. For example, here the variant for Chicago exceeds the limit, while the assets for New York and London are within the limit. Referring back to FIG. 1, all three variants can include the audio component 160A (which may be the background music, for example), but the New York and London variants may include the audio component 160B whereas the Chicago variant may include the audio component 160C. The components 160B can include, for example, navigation directions, with the audio component 160C being longer than the counterpart audio component 160B. In some cases, the audio components 160A, 160B, etc. can correspond to different languages (e.g., be different translations of the same text or meaning), and accordingly have different duration. In some implementations, after the audit engine 132 provides the indication 250 and optionally identifies the audio component(s) due to which the variant exceeds the duration limit, the user can actuate the control 210 to access the canvas for editing the content item.

In some implementations, the audit engine 312 automatically provides a listing of all audio components that make up the variant exceeding the duration limit. In other implementations, the audit engine 132 automatically determines the difference between sets of audio components that make up the variants of the content item and determines which of the audio components is present in the variant exceeding the duration limit but absent from the one or more variants that do not exceed the duration limit. Additionally or alternatively, the audio engine 312 can provide an indication of the longest audio component included in the variant, especially when the audit engine 312 cannot automatically determine which of the audio components causes the variant to exceed the duration limit (in which case the longest audio component may be the most likely candidate).

To support filtering, the audit engine 312 can process targeting signals. In particular, the operator of the workstation 110 may wish to see a subset of variants based on targeting signals. The audit engine can display all variants by default. The operator can use the interface in a tab 270 to select one or more targeting signals to add variants to interface screen 200. In an example scenario, the operator can choose the signals "car lovers" and "New York" and choose the "AND" operand to specify the relationship between the signals. Additionally or alternatively, the audit engine 312 can receive keywords as targeting signals, and display the variants that include the specified keyword(s).

In some implementations, the content item assembly engine 310 can stitch together voice audio components and support speech-to-text processing. For example, the operator can upload three assets, each 5 seconds in duration, and the content item assembly engine 310 can aggregate these voice assets into an output with the duration of 15 seconds. The audit engine 312 then can translate the aggregated output into written text. The audit engine 312 can display the text output and highlight the word currently being vocalized as the operator plays backs the aggregated output.

Further, the audit engine 312 can provide the ability to play/pause each variant created within the canvas module (accessible via the control 210). As the variant plays, the audit engine 312 can move the playhead across the variant.

As further illustrated in FIG. 2, the interface screen 200 can include a summary tab 280 in which the audit engine 312 can include an indication of the longest and shortest audio components, an indication of the total duration, a description of the visual and audio effects applied to the variant, the signals associated with the variant, etc.

Figure 3:
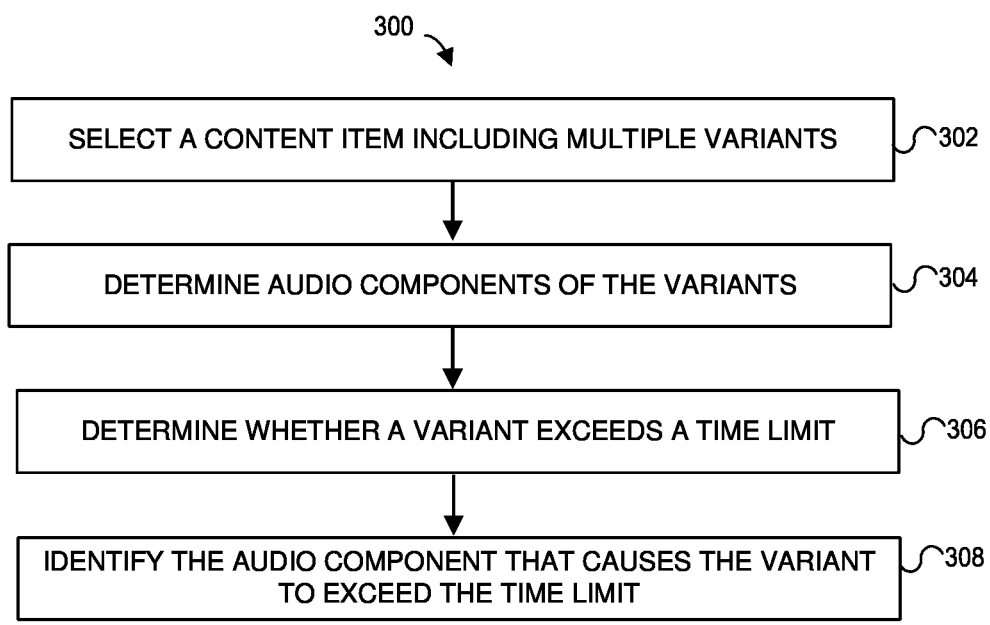
FIG. 3 is a flow diagram of an example method for managing audio assets, which can be implemented in the system of FIG. 1.

Now referring to FIG. 3, a method 300 begins at block 302, where the audit engine 312 selects a content item that includes multiple variants. The audit engine 312 can select the content item in response to user input (e.g., via user interface 200). At block 304, the audit engine 312 retrieves the set of audio components which the content item assembly engine 310 used to generate the set of variants. At block 306, the audit engine 312 determines whether any of the variants exceeds a duration limit, which may be fixed/predetermined or configured by a user (e.g., via user interface 200). At block 308, the audit engine 312 identifies the audio component that causes the variant to exceed the duration limit. To this end, the audit engine 312 can compare the sets of audio components that make up different variants and determine which component is present in the variant exceeding the limit but absent from the other variants.

The audit engine 312 can then generate an indication that the variant exceeds the time limit (see notification 250 in FIG. 2) and, in some implementations, a listing of the audio components included in the variant and/or an indication of which of the audio components likely causes the variant to exceed the duration limit.

ADDITIONAL CONSIDERATIONS

The following additional considerations apply to the foregoing discussion.

A client device in which the techniques of this disclosure can be implemented (e.g., the client device 102) can be any suitable device capable of wireless communications such as a smartphone, a tablet computer, a laptop computer, a desktop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the client device in some cases may be embedded in an electronic system such as the head unit of a vehicle or an advanced driver assistance system (ADAS). Still further, the client device can operate as an internet-of-things (IoT) device or a mobile-internet device (MID). Depending on the type, the client device can include one or more general-purpose processors, a computer-readable memory, a user interface, one or more network interfaces, one or more sensors, etc.

Certain embodiments are described in this disclosure as including logic or a number of components or modules. Modules may be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method in one or more servers for managing audio assets, the method comprising:
    selecting, by one or more processors and in response to a user input via a user interface, a content item for display at multiple geographic locations, including selecting a plurality of variants corresponding to the respective geographic locations, the plurality of variants including a shared component of the content item;
    determining, by the one or more processors, a set of audio components, wherein each of the plurality of variants includes two or more audio components of the set of audio components;
    determining whether any of the plurality of variants exceeds a duration limit; and
    in response to determining that a particular one of the plurality of variants exceeds the duration limit,
        determining, by the one or more processors, one or more audio components that likely cause the particular one of the variants to exceed the duration limit, at least in part by determining that the one or more audio components are present in the particular one of the variants but are absent from variants of the plurality of variants that do not exceed the duration limit, and
        generating, for presentation on the user interface, (i) an indication that the particular one of the variants exceeds the duration limit, and (ii) an indication of one or more audio components that likely cause the particular one of the variants to exceed the duration limit.

2. The method of claim 1, wherein the set of audio components includes audio components corresponding to different languages.

3. The method of claim 1, comprising:
providing, by the one or more processors, a listing of all audio components included in the particular one of the plurality of variants that exceed the duration limit.

4. The method of claim 1, comprising:
determining, by the one or more processors, that a longest audio component included in the variant is an audio component that likely causes the particular one of the variants to exceed the duration limit.

5. The method of claim 1, comprising:
receiving, by the one or more processors, one or more targeting signals entered by a user,
wherein selecting the plurality of variants corresponding to the respective geographic locations includes using the targeting signals to select the plurality of variants.

6. The method of claim 5, wherein the plurality of targeting signals include one or more keywords.

7. The method of claim 1, comprising:
displaying, by the one or more processors, an indication of a longest audio component and a shortest audio component of the particular one of the plurality of variants.

8. A system comprising one or more servers, the one or more servers comprising one or more processors configured to:
select, in response to a user input via a user interface, a content item for display at multiple geographic locations, including selecting a plurality of variants corresponding to the respective geographic locations, the plurality of variants including a shared component of the content item;
determine a set of audio components, wherein each of the plurality of variants includes two or more audio components of the set of audio components;
determine whether any of the plurality of variants exceeds a duration limit; and
in response to determining that a particular one of the plurality of variants exceeds the duration limit,
determine one or more audio components that likely cause the particular one of the variants to exceed the duration limit, at least in part by determining that the one or more audio components are present in the particular one of the variants but are absent from variants of the plurality of variants that do not exceed the duration limit, and
generate, for presentation on the user interface, (i) an indication that the particular one of the variants exceeds the duration limit, and (ii) an indication of one or more audio components that likely cause the particular one of the variants to exceed the duration limit.

9. The system of claim 8, wherein the set of audio components includes audio components corresponding to different languages.

10. The system of claim 8, wherein the one or more processors are configured to:
provide a listing of all audio components included in the particular one of the plurality of variants that exceed the duration limit.

11. The system of claim 8, wherein the one or more processors are configured to:
determine that a longest audio component included in the variant is an audio component that likely causes the particular one of the variants to exceed the duration limit.

12. The system of claim 8, wherein the one or more processors are configured to:
receive one or more targeting signals entered by a user,
wherein selecting the plurality of variants corresponding to the respective geographic locations includes using the targeting signals to select the plurality of variants.

13. The system of claim 12, wherein the plurality of targeting signals include one or more keywords.

14. The system of claim 8, wherein the one or more processors are configured to:
display an indication of a longest audio component and a shortest audio component of the particular one of the plurality of variants.

* * * * *